March 28, 1939. C. H. TURNER 2,152,393
FEEDING MECHANISM FOR THRESHERS
Filed April 15, 1937 3 Sheets-Sheet 1
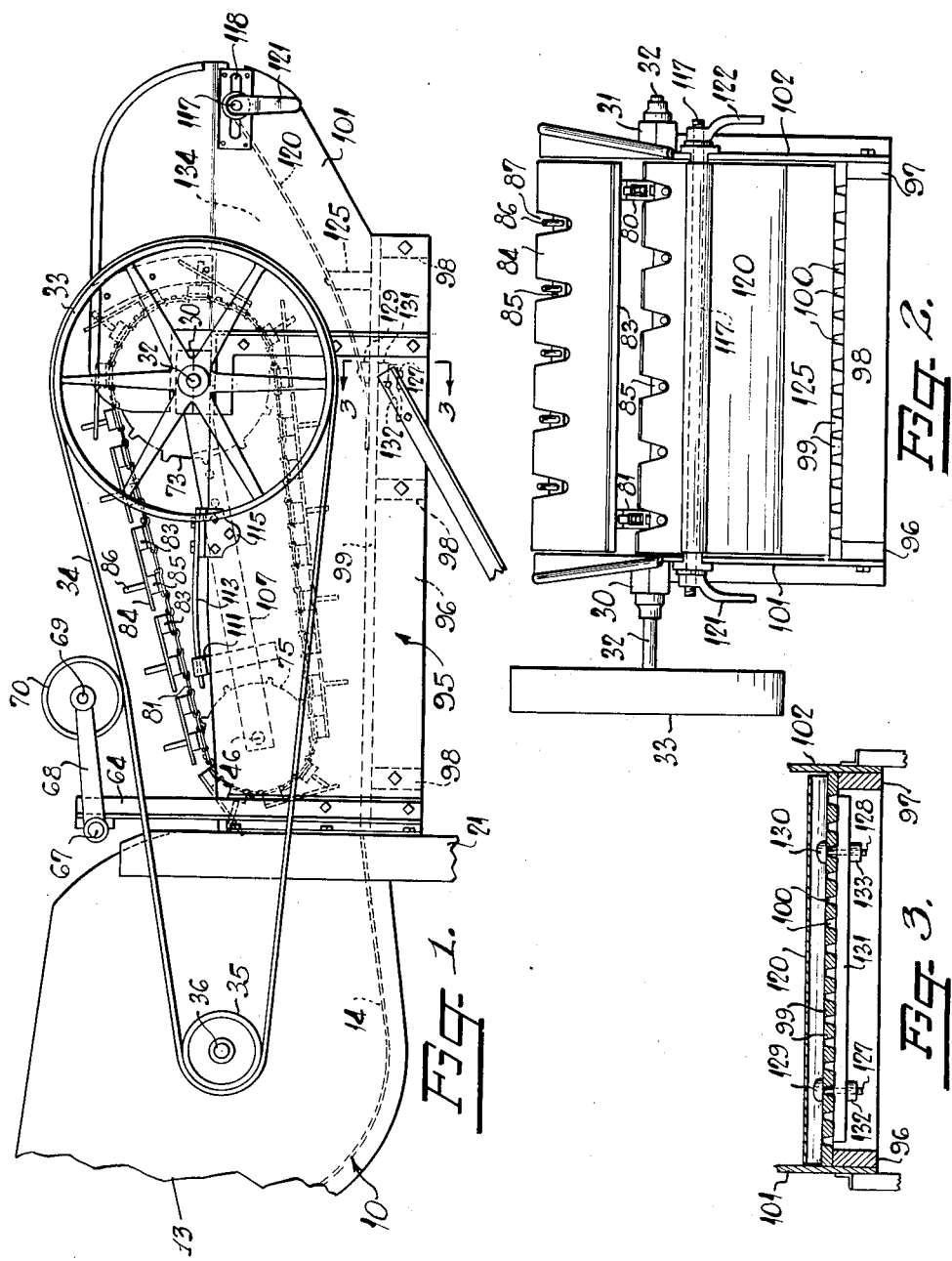
Inventor:
C. H. TURNER
By Paul S Eaton
Attorney

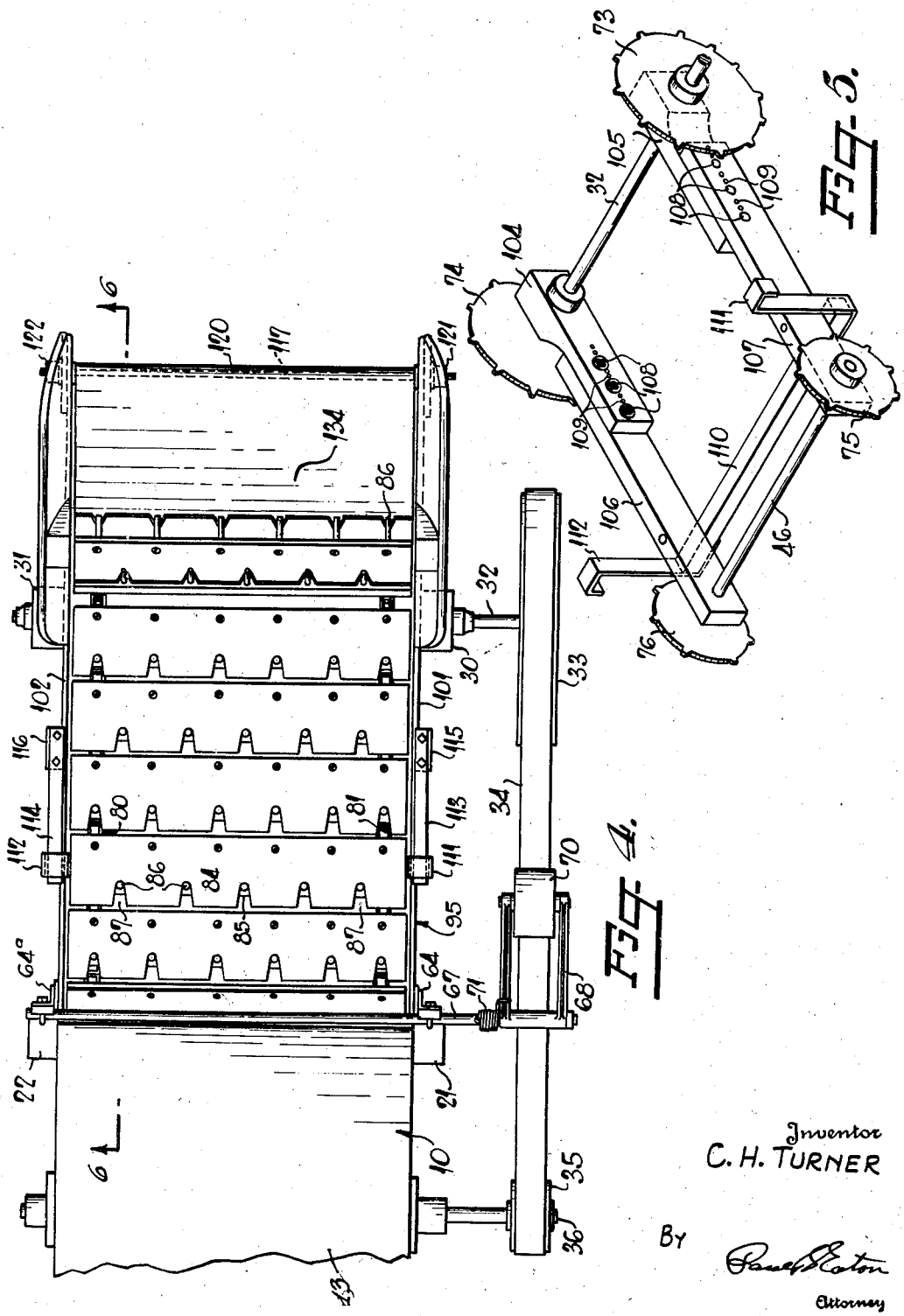

March 28, 1939.  C. H. TURNER  2,152,393
FEEDING MECHANISM FOR THRESHERS
Filed April 15, 1937  3 Sheets-Sheet 3

Inventor:
C. H. TURNER
By Power & Eaton
Attorney

Patented Mar. 28, 1939

2,152,393

UNITED STATES PATENT OFFICE 2,152,393

FEEDING MECHANISM FOR THRESHERS

Charles H. Turner, Statesville, N. C.

Application April 15, 1937, Serial No. 137,084

4 Claims. (Cl. 198—178)

This invention relates to a feeding mechanism for vegetation processing machines, such as peanut threshers, peanut strippers, hay balers, threshing machines of all types, ensilage cutters, hammer mills and the like.

Briefly stated, my invention comprises an endless conveyor having a plurality of transversely disposed slats, each provided with pins and these slats being disposed on a pair of spaced endless sprocket chains. Each alternate slat has thereon a sheet member having notches therein in which the teeth of an adjacent slat operate. A suitable trough is disposed below the conveyor and onto which the vegetation is delivered to be engaged by the teeth or pins of the conveyor to move the vegetation into the machine with which it is associated. As the chains move past the sprocket wheels on which they are mounted, the sheet members will be swung so that the free ends of the sheets will travel at a much greater rate of speed than the chains. This not only will force any matter on the teeth from engagement with the teeth, but will also exert a kicking action to kick the vegetation into the machine with which the feeding means is associated.

It is an object of this invention to provide a feeding mechanism for vegetation processing machines such as peanut pickers, or threshers, hay bailers, ensilage cutters, and in fact any type of machine into which vegetation of any kind is fed for processing, said apparatus comprising a trough having an endless conveyor disposed thereabove which is pivotally mounted at its outer end and therefore allowing pivotal movement of the endless conveyor at the end next to the machine with which it is associated, said feeding mechanism also having the feature of self-adjustment. For example, in case of over-feeding, the material may be carried back over the top of the endless conveyor and discharged again onto the bottom of said trough to co-mingle with the other vegetation and to again be fed toward the machine.

Some of the objects of the invention having been stated, other objects will appear as the description proceeds when taken in connection with the accompanying drawings in which—

Figure 1 is an elevation of the invention associated with a portion of a processing machine;

Figure 2 is an elevation looking at the right-hand end of Figure 1;

Figure 3 is a transverse sectional detail view taken along line 3—3 in Figure 1;

Figure 4 is a plan view of Figure 1;

Figure 5 is an isometric view of the supporting means for the conveyor belt and its associated parts;

Figure 6:
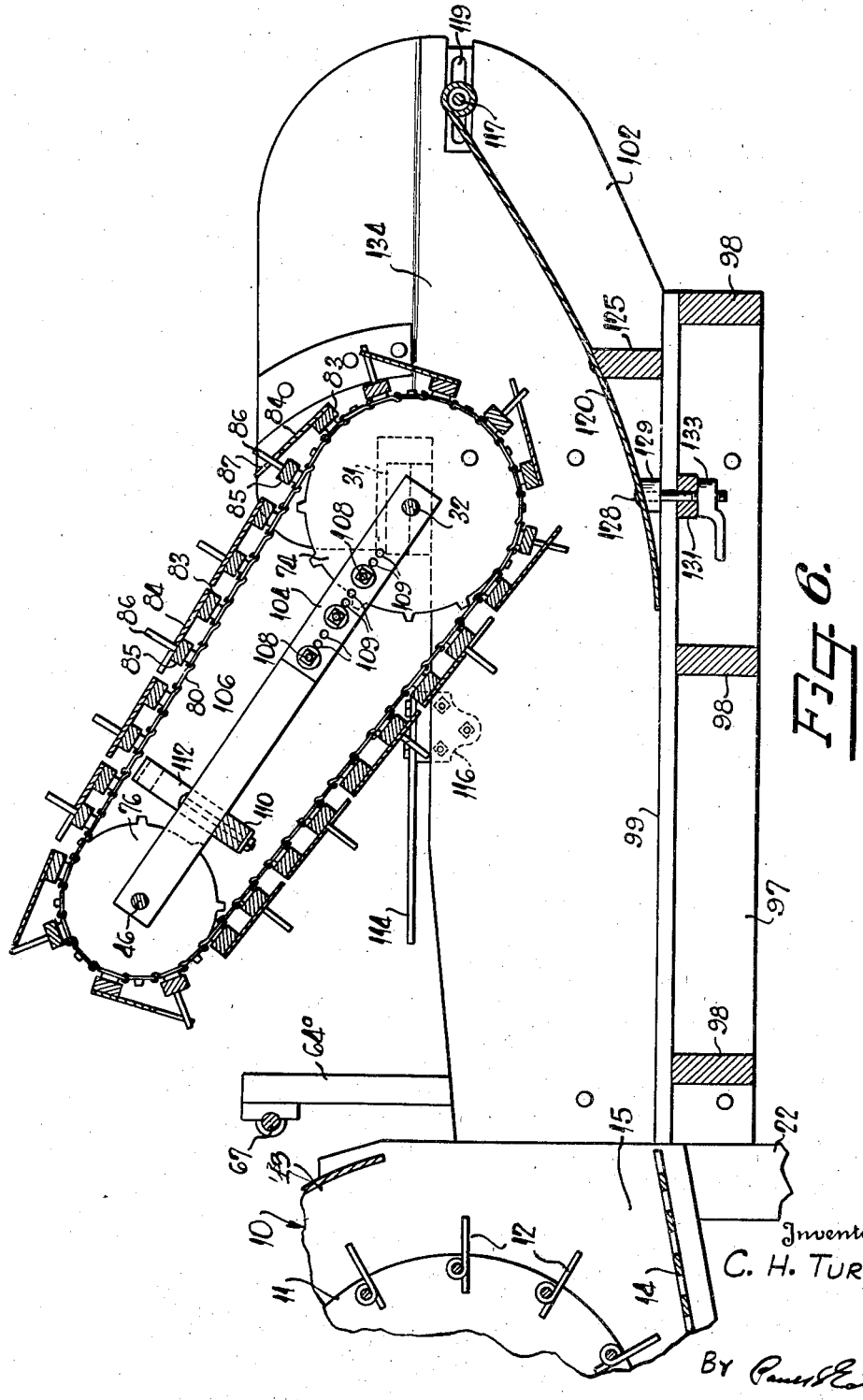
Figure 6 is a longitudinal, sectional view taken along line 6—6 in Figure 4 but showing the conveyor rotated to an inoperative position so as to allow the portions thereof to be inspected or repaired.

Referring more specifically to the drawings, the numeral 10 indicates a vegetation processing machine such as a peanut picker, peanut thresher, threshing machine for grains, hay baler and the like, having a cylinder 11 provided with spring teeth 12 and having a covering 13 and a screened bottom 14. This machine has an opening 15 into which the vegetation being processed is fed. The apparatus thus far described is conventional and various forms of feeding apparatus heretofore have been associated with such machines.

My feeding apparatus comprises a suitable framework 95 comprising supporting side pieces 96 and 97 with cross pieces 98 supporting a latticed bottom 99 comprising a plurality of strips 100 disposed longitudinally of the framework 95. The framework 95 is supported by vertical members 21 and 22. The framework has side members 101 and 102. Secured to these side members 101 and 102 and to vertical posts 21 and 22 are angle iron members 64 and 64a, having bearing members on their upper ends supporting a cross shaft 67 for oscillation. The cross shaft 67 has a forked arm 68 having a cross shaft 69 in the free end thereof supporting a tightener pulley 70. Torsion spring 71 urges the pulley 70 against a belt 34. The side members 101 and 102 have secured therein bearings 30 and 31 for receiving a rotatable shaft 32. The shaft 32 has fixedly secured thereon on the outside of member 101, a pulley 33 and the endless driving belt 34 is mounted on the pulley 33 and also on a pulley 35 mounted on a beater shaft 36. Fixedly mounted on shaft 32 are sprocket wheels 73 and 74. Mounted for oscillation on shaft 32 are members 104 and 105 to which are adjustably secured members 106 and 107 by means of bolts 108 penetrating suitable holes 109 in the members 104 and 106 respectively and 105 and 107 respectively. In the free end of members 106 and 107 there is mounted for rotation a shaft 46 having sprocket wheels 75 and 76 on the ends thereof. Mounted on sprocket wheels 74 and 76 is an endless sprocket chain 80 and mounted on sprocket wheels 73 and 75 is a similar sprocket chain 81. Every alternate link of these two endless link belts or sprocket chains have secured thereto cross slats 83 and 85. The cross slats 83 appearing at every fourth link of the sprocket chain and the cross slats 83 appearing between the slats 85. The slats 85 have a plurality of teeth 86 projecting therefrom and the cross slats 83 each have one edge of a sheet metal member 84 secured thereto. The sheet metal members 84 have notches 87 in their free edges of substantial depth through which the teeth 86 are adapted to project. These slots 87 are open at the outer or free end of the sheet metal members 84. In normal position, these sheet metal members form a substantially continuous surface, shielding and covering the spaces between the slats 83 and 85.

The various shafts previously described are driven from a source of power, not shown, which is connected to the cylinder shaft 36. The adjustability of members 104 and 106, 105 and 107 gives the proper slack in the sprocket chains 80 and 81. It is evident that if adjustment is desired to be made, the bolts 108 will merely have to be removed from the holes in members 104 and 106, and 105 and 107 which they occupy and the members repositioned so that another set of holes will coincide, after which the bolts 108 will again be inserted. Secured to the members 106 and 107 at a point near the shaft 46 is a cross member 110 which has secured at each end thereof hook members 111 and 112. These members project upwardly on the interior of sidewalls 101 and 102 and have their upper hooked portions normally engaging the free ends of leaf springs 113 and 114, respectively. One end of these springs is anchored to brackets 115 and 116, which in turn are secured to the sides of the sidewalls 101 and 102.

It will be noted that the posts 64 and 64a are placed close to the discharge end of the trough in order to allow the conveyor and its associated parts to be pivoted about the shaft 32, and its free end entirely removed from the chute. In other words, the free end of the conveyor will clear the cross shaft 67 when it is desired to remove the same therefrom to a position substantially as shown in Figure 6. Of course it is necessary to provide the supporting springs 113 and 114 for the free end of the conveyor.

In order to provide means for adjusting the vertical cross sectional area of the feed opening, a suitable rod 117 has its ends inserted in slots 118 and 119. These slots are disposed in the sides 101 and 102 so that the position of rod 117 may be adjusted relative to the cylinder 11. This rod has one edge of an arcuate plate 120 secured around the same, said plate extending downwardly and having its lower end resting upon the latticed bottom 99.

The rod 117 has its ends projecting past the sides 101 and 102 and on these ends are threadably mounted nuts 121 and 122 so that the arcuate plate 120 may be fastened in the desired position relative to the conveyor and between the two sides. The lower intermediate portion of the plate 120 has a support 125 secured thereto which support has its lower end also resting upon latticed bottom 99 and is adapted to slide thereon when the plate 120 is moved to the right or to the left in Figures 1 and 6. The manner of securing the lowermost end of the plate 120 to the latticed bottom 99 comprises suitable bolts 127 and 128 which bolts penetrate the plate member 120 and have washers 129 and 130 placed therearound. The lower side of these washers normally rests against the upper side of the latticed bottom 99. The bolts 127 and 129 penetrate a cross bar 131 which is disposed directly on the lower side of this bottom, said bar being clamped against the lower side of the bottom and onto the bolts 127 and 128 by means of nuts 132 and 133, respectively.

Whenever it is desired to adjust the size of the opening 134 between the plate 120 and the conveyor it is necessary to loosen the nuts 121, 122, 127 and 128 so that the plate member 120 may be moved longitudinally of the trough or chute. After the proper opening has been made, then the parts are tightened in position so that both the upper and lower ends of the plate will be rigidly held in place.

It is therefore seen that I have provided a pivoted feed conveyor which is resiliently mounted to allow variable quantities of vegetation to enter therein with means for adjusting the area of the opening to control the initial amount fed thereto.

I have also provided a conveyor which provides an impelling movement to the vegetation at its delivery end where it is delivered to the processing machine so that the dead space which normally is present between the conveyor and the cylinder in the processing machine is traversed by the vegetation due to this impelling movement.

Another important function is the fact that the plates for cleaning the teeth on the conveyor belt cover substantially the entire periphery of the conveyor thereby preventing any vegetation from gaining access to the interior of the conveyor belt.

It is thus seen that as the material is being delivered into the opening 15 due to the curvature of the sprocket wheels 75 and 76 the sheet metal members 84 will have relative movement to the pins 86 and discharge the vegetation from the pins or teeth 86 and will also exert a kicking action to kick the vegetation into the opening 15. This is true on account of the fact that movement of the tips of members 84 will be at a much greater rate than the ordinary rate of travel of the conveyor belts as a result of the radial motion of the plate members 84.

I claim:

1. Apparatus for feeding vegetation to vegetation processing machines comprising a trough having a pair of spaced sidewalls and a bottom and an intake end and a discharge end, a shaft mounted for rotation in the intake end of said trough, a pair of members pivotally mounted on said shaft and extending towards the discharge end of said trough, a second shaft mounted in the free ends of said members, a pair of sprocket wheels mounted in spaced relation on each of said shafts, a pair of sprocket chains mounted on said sprocket wheels, transversely disposed bars mounted on said sprocket chains, alternately disposed bars having teeth projecting therefrom, the other bars having each one edge of a sheet member secured thereto and having its outer edge slotted to partially surround said teeth on the next succeeding alternate bar and extending to within close proximity to the next succeeding other bar and substantially closing the spaces between all of the bars, the lower portion of said sprocket chains being spaced at all times from the bottom of said trough, means for driving said chains to propel inserted vegetation into said processing machine, the free end of said members supporting said second shaft being upwardly movable by an excess of vegetation being inserted thereunder, and said sheet members moving outwardly relative to the teeth as the chains pass by the sprocket wheels on said second shaft to clear vegetation from the teeth and to move the vegetation into the processing machine at a greater rate than the travel of the sprocket chains.

2. A feeder for threshing machines and the like comprising a trough having a bottom, two sides and open intake and discharge ends, the discharge end being adapted to be positioned in close proximity to the intake end of the machine, said feeder having an endless conveyor disposed in spaced relation above the bottom of the trough and being pivoted at the intake end of the trough and having its end next to the machine free for vertical swinging movement, said conveyor having a plurality of transversely disposed bars, alternate bars having outwardly projecting teeth mounted therein and the other bars having each secured thereto one edge of a metallic plate having slots in its other edge through which the teeth in the alternate bars project, the outer edge of the sheet members extending to within close proximity to the next adjacent alternate bar and substantially covering the space between all of the bars, the free edge of each sheet moving outwardly relative to the teeth when the bars pass the end of the conveyor to clear the teeth of any clinging vegetation and to propel said vegetation into said machine, and a movable plate in the intake end of the trough remote from the processing machine for regulating the size of the opening in the intake end of said trough.

3. Feeding mechanism for peanut threshing machines and the like, comprising a trough having sidewalls and intake and discharge ends, means for mounting the trough to place its discharge end in close proximity to the intake end of the threshing machine, a conveyor disposed in said trough, said conveyor comprising a shaft mounted for rotation in spaced relation above the bottom of the trough and near the intake end of the trough, a pair of sprocket wheels on said shaft, a frame pivotally supported by said shaft and extending towards the discharge end of the trough, a second shaft mounted for rotation in the free end of said frame, a pair of sprocket wheels mounted on said second shaft, a pair of sprocket chains mounted on said sprocket wheels, some of the links of said chain having transversely disposed bars thereon having teeth projecting outwardly therefrom, others of said links of said chains having other transversely disposed bars devoid of teeth secured thereto to which one edge of a sheet metal member is secured, the other edge of each sheet metal member having notches therein and extending to a point adjacent the bars devoid of teeth and substantially closing the space between the bars which are devoid of teeth through which the teeth in the first-named bars are adapted to project, so that when the bars pass over the sprocket wheels, the free edge of the sheet metal members will have relative movement outwardly of the teeth on the first-named bars to clear the teeth and project the vegetation into the threshing machine and also to remove any remaining vegetation from the teeth as the links of the chain pass over the sprocket wheels at the intake end of the trough.

4. A conveyor comprising a frame, a shaft mounted for rotation in each end of the frame, means supporting one of the shafts to serve as a pivot for the frame, said shafts having a sprocket wheel on each end thereof, a sprocket chain mounted on the sprocket wheels on one end of said shafts and a second sprocket chain mounted on the sprocket wheels on the other ends of said shafts, a plurality of transversely disposed bars mounted on some of the links of the chains and other transversely disposed bars mounted on other links of said chains, the first bars having a plurality of teeth projecting therefrom and the second bars each having one edge of a sheet metal member secured thereto, the other edge of each of said sheet metal members being slotted to partially encircle the teeth on the next adjacent bar and extending to a point adjacent the next adjacent other bar and substantially covering the space between said other bars so that when the chains pass by the sprocket wheels, the other edge of the sheets will move outwardly past the ends of the teeth on the adjacent bars to remove vegetation therefrom.

CHARLES H. TURNER.